(12) United States Patent
Batal et al.

(10) Patent No.: US 9,593,631 B2
(45) Date of Patent: Mar. 14, 2017

(54) SYSTEM AND METHOD FOR LOCATING AN ENGINE EVENT

(71) Applicant: GENERAL ELECTRIC COMPANY, Schenectady, NY (US)

(72) Inventors: Iyad Batal, San Ramon, CA (US); Jeffrey Jacob Bizub, Milwaukee, WI (US); Brett Alexander Matthews, Brooklyn, NY (US)

(73) Assignee: General Electric Company, Niskayuna, NY (US)

( * ) Notice: Subject to any disclaimer, the term of this patent is extended or adjusted under 35 U.S.C. 154(b) by 181 days.

(21) Appl. No.: 14/667,275

(22) Filed: Mar. 24, 2015

(65) Prior Publication Data

US 2016/0281617 A1    Sep. 29, 2016

(51) Int. Cl.
*F02D 35/02* (2006.01)
*G01L 23/22* (2006.01)
*F02D 41/28* (2006.01)
*F02P 5/152* (2006.01)

(52) U.S. Cl.
CPC ......... *F02D 35/027* (2013.01); *F02D 35/022* (2013.01); *F02D 35/024* (2013.01); *F02D 41/28* (2013.01); *F02P 5/152* (2013.01); *G01L 23/22* (2013.01); *G01L 23/221* (2013.01); *F02D 2041/288* (2013.01)

(58) Field of Classification Search
CPC .... F02D 35/022; F02D 35/024; F02D 35/027; G01K 23/22; G01K 23/221
USPC ......... 123/350, 435, 406.21, 90.15; 701/111; 73/114.16, 35.09, 35.12, 114.18
See application file for complete search history.

(56) References Cited

U.S. PATENT DOCUMENTS

| 4,446,722 | A |   | 5/1984  | Boruschewitz et al. |
|-----------|---|---|---------|----------------------|
| 4,491,010 | A |   | 1/1985  | Brandt et al. |
| 5,052,214 | A | * | 10/1991 | Dils ............ F02D 35/022 701/111 |
| 5,675,505 | A | * | 10/1997 | Trimboli ........ G01M 7/022 701/111 |
| 5,763,769 | A |   | 6/1998  | Kluzner |
| 5,837,887 | A |   | 11/1998 | Shibata et al. |

(Continued)

FOREIGN PATENT DOCUMENTS

EP    0392650 A1    10/1990

OTHER PUBLICATIONS

Horner, Thomas G., Engine Knock Detection Using Spectral Analysis Techniques with a TMS320 DSP, Texas Instruments, Aug. 1995, pp. 1-62.

(Continued)

*Primary Examiner* — Mahmoud Gimie
(74) *Attorney, Agent, or Firm* — Ann M. Agosti (57) ABSTRACT

Systems and methods for estimating an engine event location are disclosed herein. In one embodiment, a controller is configured to receive a signal from at least one knock sensor coupled to a reciprocating engine, transform the signal, using a multivariate transformation algorithm, into a power spectral density, transform the power spectral density into a plurality of feature vectors using predictive frequency bands, predict the engine event location using at least the plurality of feature vectors and a predictive model, and adjust operation of the reciprocating engine based on the engine event location.

20 Claims, 9 Drawing Sheets

(56) References Cited

U.S. PATENT DOCUMENTS

| | | | |
|---|---|---|---|
| 5,965,804 A | 10/1999 | Sakamoto | |
| 6,275,765 B1* | 8/2001 | Divljakovic | G01M 15/05 |
| | | | 701/102 |
| 6,285,947 B1* | 9/2001 | Divljakovic | G05B 23/0235 |
| | | | 701/110 |
| 7,383,799 B1* | 6/2008 | Wynveen | F01L 1/20 |
| | | | 123/90.15 |
| 7,430,483 B2* | 9/2008 | Wiig | G01H 1/003 |
| | | | 701/100 |
| 8,342,011 B2 | 1/2013 | Galtier et al. | |
| 8,429,955 B2 | 4/2013 | Taglialatela Scafati et al. | |
| 8,849,549 B2 | 9/2014 | Jin et al. | |
| 2007/0038392 A1 | 2/2007 | Iyer et al. | |
| 2010/0031924 A1 | 2/2010 | Sun et al. | |
| 2012/0150414 A1 | 6/2012 | Huang | |

OTHER PUBLICATIONS

Villarino et al., "Pressure reconstruction and misfire detection from multichannel structure-borne sound". Proceedings of IEEE International Conference on Acoustics, Speech, and Signal Processing, vol. No. 02, pp. 141-144, May 17-21, 2004.

European Search Report and Written Opinion issued in connection with Corresponding EP Application No. 16161757.6 on Oct. 25, 2016.

* cited by examiner

| Dataset | # Cycles | MEA (°) | Mean Δt (°) | STDEV Δt (°) | Miss rate |
|---|---|---|---|---|---|
| VHP L5794GSI (base) | 250 | 1.528 | 1.314 | 1.285 | 0.00% |
| VHP L5794GSI (knock) | 250 | 1.927 | 0.555 | 2.754 | 1.61% |
| Jenbacher type 4 | 50 | 1.435 | -0.831 | 1.703 | 0.00% |
| CFR-RON | 400 | 0.788 | 0.175 | 1.653 | 0.49% |

FIG. 11

SYSTEM AND METHOD FOR LOCATING AN ENGINE EVENT

BACKGROUND

The subject matter disclosed herein relates to systems and methods for estimating a location of an engine event in a combustion engine.

Combustion engines typically combust a carbonaceous fuel, such as natural gas, gasoline, diesel, and the like, and use the corresponding expansion of high temperature and pressure gases to apply a force to certain components of the engine (e.g., piston disposed in a cylinder) to move the components over a distance. Each cylinder may include one or more valves that open and close in conjunction with combustion of the carbonaceous fuel. For example, an intake valve may direct an oxidant such as air into the cylinder. A fuel mixes with the oxidant and combusts (e.g., ignition via a spark) to generate combustion fluids (e.g., hot gases), which then exit the cylinder via an exhaust valve.

The location (e.g., timing or crank angle) of some engine events (e.g., peak firing pressure, or opening and closing of intake and/or exhaust valve) may affect fuel economy, power, and other operational parameters. Unfortunately, using in-cylinder sensors to determine the location of such events may be expensive and uneconomical.

BRIEF DESCRIPTION

A summary of certain embodiments disclosed herein is set forth below. It should be understood that these aspects are presented merely to provide the reader with a brief summary of these embodiments and that these aspects are not intended to limit the scope of this disclosure. Indeed, this disclosure may encompass a variety of aspects that may not be set forth below.

In one embodiment, a system for estimating an engine event location includes a controller configured to receive a signal from at least one knock sensor coupled to a reciprocating engine, transform the signal, using a multivariate transformation algorithm, into a power spectral density, transform the power spectral density into a plurality of feature vectors using predictive frequency bands, predict the engine event location using at least the plurality of feature vectors and a predictive model, and adjust operation of the reciprocating engine based on the engine event location.

In another embodiment, a method for training a controller to estimate the location of peak firing pressure in a reciprocating engine includes receiving a first signal from at least one knock sensor, where the signal comprises at least data corresponding to a peak firing pressure event. The method also includes receiving a second signal from a pressure sensor corresponding to a true peak firing pressure location. Additionally, the method includes transforming the first signal into a power spectral density and comparing the power spectral density to the second signal to form predictive frequency bands. Finally, the method includes converting the power spectral density into a plurality of feature vectors and executing an algorithm to generate a predictive model using the plurality of feature vectors and the second signal, wherein the predictive model is configured to estimate the location of peak firing pressure in the reciprocating engine during ordinary engine operation.

In another embodiment, a system includes a reciprocating engine controller configured to receive a signal from at least one knock sensor coupled to the reciprocating engine and to transform the signal into a power spectral density using a multivariate transformation algorithm. The controller also transforms the power spectral density into a plurality of feature vectors using predictive frequency bands and predicts a peak firing pressure location using at least the plurality of feature vectors and a predictive model. Finally, the controller is configured to output a control action for at least the reciprocating engine based on the location of the peak firing pressure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The presently disclosed systems and methods relate to estimating a location (e.g., timing) of an engine event (e.g., peak firing pressure or closure of an intake/exhaust valve) in a reciprocating, internal combustion engine using one or more sensors, such as a knock sensor. A knock sensor may include an acoustic or sound sensor, a vibration sensor, or any combination thereof. For example, the knock sensor may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. The knock sensor may monitor acoustics and/or vibrations associated with combustion in the engine to detect a knock condition (e.g., combustion at an unexpected time not during a normal window of time for combustion), or other engine events that may create acoustic and/or vibration signals. In other embodiments, the sensor may not be a knock sensor, but any sensor that may sense vibration, pressure, acceleration, deflection, or movement.

In certain instances, it may be desirable to estimate the timing of various engine events (e.g., peak firing pressure or closure of an intake/exhaust valve) that are indicative of engine performance. Locating such events may enable a user or controller to adjust various parameters based on the operating condition information to optimize engine performance. However, sensors (e.g., pressure sensors) positioned within an engine cylinder and configured to locate such events may be significantly more expensive than knock sensors and may be more susceptible to damage. Therefore, it may be advantageous to train (e.g., via machine learning) a controller to convert or transform a signal from a knock sensor into a form that may enable an accurate prediction of the location (e.g., timing) of an engine event. Such a system may estimate the location (e.g., timing) of the engine event with accuracy comparable to that of an in-cylinder sensor (e.g., pressure sensor), while having the benefit of being less expensive and more robust.

Because of the percussive nature of combustion engines, knock sensors may be capable of detecting signatures even when mounted on the exterior of an engine cylinder. However, the knock sensors may also be disposed at various locations in or about one or more cylinders. Knock sensors detect, e.g., vibrations of the cylinder, and a controller may convert a vibrational profile of the cylinder, provided by a knock sensor, into useful parameters for estimating the location of an engine event. It is now recognized that knock sensors detect vibrations in, or proximate to, the cylinder, and may communicate a signal indicative of the vibrational profile to a controller, which may convert the signal and make various computations to produce the estimated location. The present disclosure is related to systems and methods for determining a location (e.g., timing) of an engine event (e.g., peak firing pressure or closure of an intake/exhaust valve) by training a controller or other computing device to locate a desired engine event in a knock sensor signal.

Figure 1:
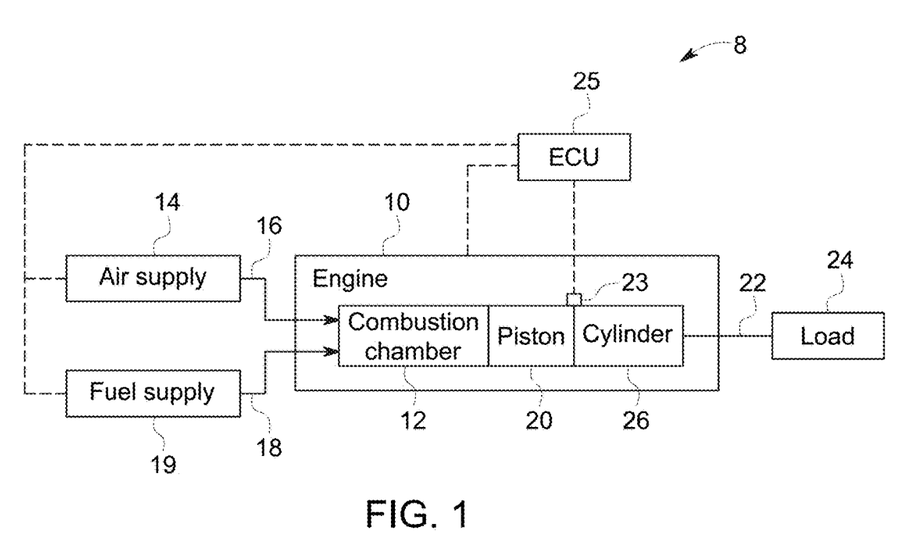
FIG. 1 illustrates a block diagram of a portion of an engine driven power generation system having a reciprocating internal combustion engine, in accordance with aspects of the present disclosure.

Turning to the drawings, FIG. 1 illustrates a block diagram of an embodiment of a portion of an engine driven power generation system having a reciprocating internal combustion engine, which may experience an engine event that may be located using the presently disclosed system and methods. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An oxidant supply 14 (e.g., an air supply) is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26, which converts pressure exerted by the gases into a rotating motion, thereby causing a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example. The fuel 18 may also include a variety of liquid fuels, such as gasoline or diesel fuel.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders 26 (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders 26 and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may sense vibrations, acoustics, or sound caused by combustion in the engine 10, such as vibrations, acoustics, or sound due to detonation, pre-ignition, and/or pinging. The knock sensor 23 may also sense vibrations, acoustics, or sound caused by intake or exhaust valve closures. Therefore, the knock sensor 23 may include an acoustic or sound sensor, a vibration sensor, or a combination thereof. For example, the knock sensor 23 may include a piezoelectric vibration sensor. The knock sensor 23 is shown communicatively coupled to a system 25 (e.g., a control system, a monitoring system, a controller, or an engine control unit "ECU"). During operations, signals from the knock sensor 23 are communicated to the system 25 to determine if knocking conditions (e.g., pinging) exist. The system 25 may adjust operating parameters of the engine 10 to enhance engine performance. For example, the system 25 may adjust an engine timing map of the engine 10, an oxidant/fuel ratio of the engine 10, a flow of exhaust recirculation gas of the engine 10, a position of an intake or exhaust valve, or another operating parameter of the engine 10.

Figure 2:
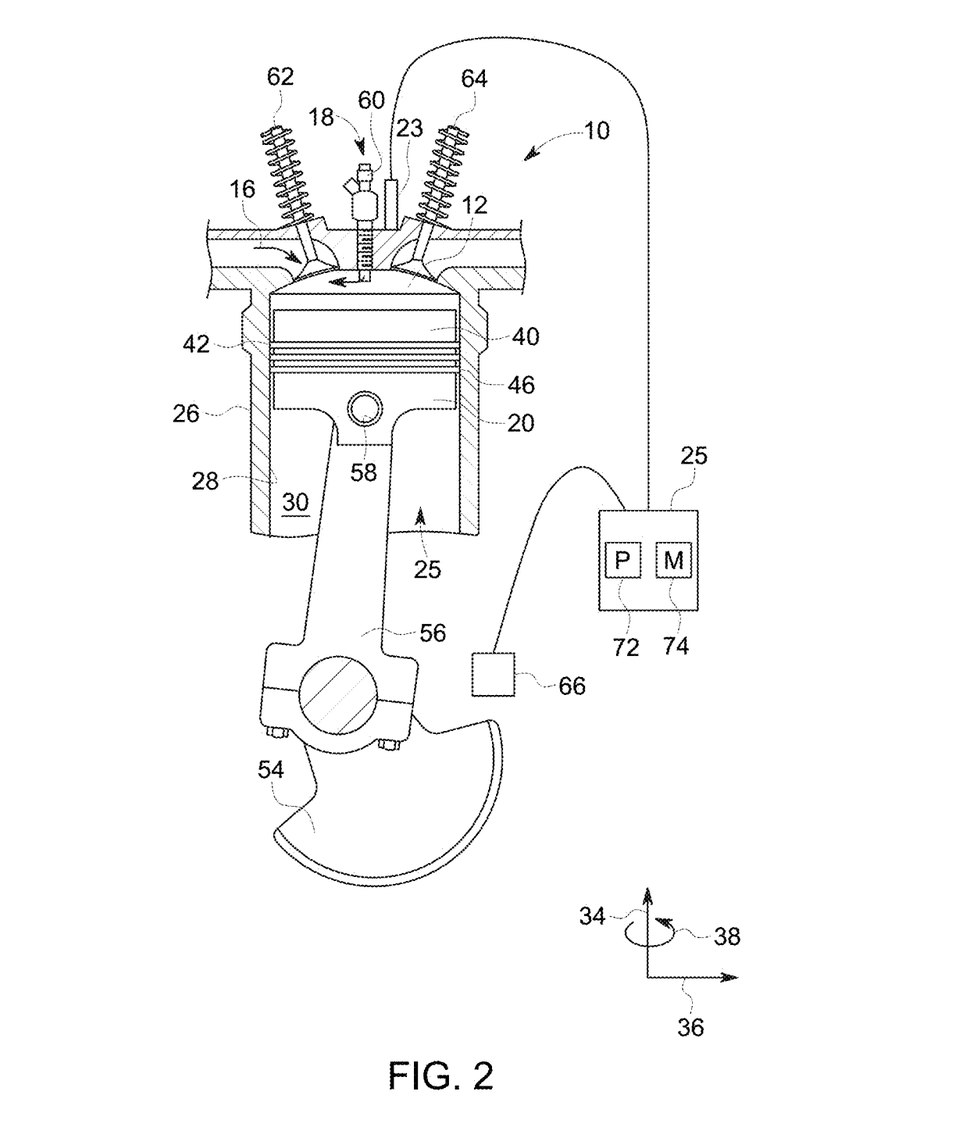
FIG. 2 illustrates a cross-sectional side view of a piston-cylinder assembly having a piston disposed within a cylinder of the reciprocating engine of FIG. 1, in accordance with aspects of the present disclosure.

FIG. 2 is a cross-sectional side view of an embodiment of a piston-cylinder assembly having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of oxidant (e.g., air 16) to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the oxidant 16 in the combustion chamber 12 may cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from TDC to BDC or from BDC to TDC, the crankshaft 54 rotates one half of a revolution. Each movement of the piston 20 from TDC to BDC or from BDC to TDC is called a stroke, and engine 10 embodiments may include two-stroke engines, three-stroke engines, four-stroke engines, five-stroke engines, six-stroke engines, or more.

During engine 10 operations, a sequence including an intake process, a compression process, a power process, and an exhaust process typically occurs. The intake process enables a combustible mixture, such as fuel 18 and oxidant 16 (e.g., air), to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then urges the piston 20 to BDC. The exhaust process typically returns the piston 20 to TDC, while keeping the exhaust valve 64 open. The exhaust process thus expels the spent fuel-air mixture through the exhaust valve 64. It is to be noted that more than one intake valve 62 and exhaust valve 64 may be used per cylinder 26

The depicted engine 10 may include a crankshaft sensor 66, knock sensor 23, and the system 25, which includes a processor 72 and memory unit 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft angle. For example, a full cycle of a four stroke engine 10 may be measured as a 720° cycle. The knock sensor 23 may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. In other embodiments, the sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder may include one or more knock sensors 23. The crankshaft sensor 66 and the knock sensor 23 are shown in electronic communication with the system 25 (e.g., a control system, a monitoring system, a controller, or an engine control unit "ECU"). The system 25 may include non-transitory code or instructions stored in a machine-readable medium (e.g., the memory unit 74) and used by a processor (e.g., the processor 72) to implement the techniques disclosed herein. The memory may store computer instructions that may be executed by the processor 72. Additionally, the memory may store look-up tables and/or other relevant data. The system 25 monitors and controls the operation of the engine 10, for example, by adjusting ignition timing, timing of opening/closing valves 62 and 64, adjusting the delivery of fuel and oxidant (e.g., air), and so on.

In certain embodiments, other sensors may also be included in the system 8 and coupled to the system 25. For example, the sensors may include atmospheric and engine sensors, such as pressure sensors, temperature sensors, speed sensors, and so forth. For example, the sensors may include knock sensors, crankshaft sensors, oxygen or lambda sensors, engine air intake temperature sensors, engine air intake pressure sensors, jacket water temperature sensors, engine exhaust temperature sensors, engine exhaust pressure sensors, and exhaust gas composition sensors. Other sensors may also include compressor inlet and outlet sensors for temperature and pressure.

During the power process of engine operation, a force (e.g., a pressure force) is exerted on the piston 20 by the expanding combustion gases. The maximum force exerted on the piston 20 is described as the peak firing pressure ("PFP"). It may be desirable that the PFP occur a few crank angle degrees after the piston 20 has reached TDC so that the maximum amount of force may be exerted on the piston 20. Therefore, having the ability to estimate the location (e.g., timing or crank angle) of PFP using the knock sensor 23 is desirable because the location of PFP may be compared to the location of TDC to assess whether the engine 10 is operating at an optimal efficiency. Moreover, if the timing of PFP is not at an optimal level, various engine parameters (e.g., ignition timing, fuel/air ratio, intake or exhaust valve closure timing, etc.) may be adjusted to enhance engine performance. For example, the system 25 may adjust an engine timing map of the engine 10, an oxidant/fuel ratio, a flow of exhaust recirculation gas, a position of the intake 62 or exhaust valve 64, or another operating parameter of the engine 10.

Additionally, it may also be desirable to estimate a location (e g, timing) of other engine events. For example, estimating the location of the exhaust valve 64 closure may enable a user or the system 25 to determine whether the exhaust valve 64 is working properly or whether it is stuck in an open position or a closed position. Keeping the exhaust valve 64 open for a certain amount of time may enhance engine efficiency. Thus, while the present disclosure mainly focuses on estimating the location of PFP during engine operation, it should be noted that the disclosed systems and methods may be used to estimate a location of other engine events (e.g., closure of the exhaust valve 64).

The present disclosure relates to predicting a timing of an engine event (e.g., PFP or closure of the exhaust valve 64 or the intake valve 62) using a signal from the knock sensor 23. In certain embodiments, the system 25 is trained (e.g., via machine learning) to associate features of a knock sensor signal to an occurrence of a desired engine event.

Figure 3:
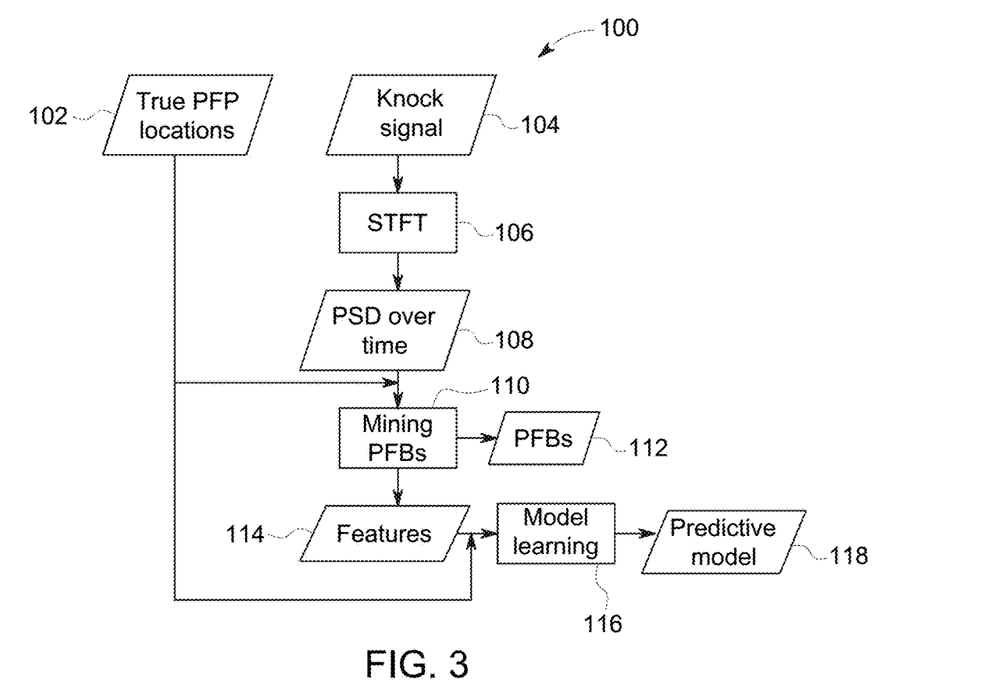
FIG. 3 illustrates a flow chart of a method for training a system to estimate a location of an engine event by developing a predictive model and predictive frequency bands ("PFBs"), in accordance with aspects of the present disclosure.

FIG. 3 illustrates a flow chart 100 of a method for training the system 25 (e.g., a control system, a monitoring system, a controller, or an engine control unit "ECU") by developing a predictive model and predictive frequency bands ("PFBs") to estimate a time of the desired engine event (e.g., PFP). At block 102, a true location (e.g., timing) of the desired engine event(s) are received or input into the system 25. The true locations may be determined by a pressure signal plot such as that illustrated in FIG. 5, or another signal measuring a relevant engine operating parameter (intake valve 62 or exhaust valve 64 position, oxidant flow rate, or exhaust gas flow rate) indicative of the desired engine event over time. Additionally, the system 25 receives a knock sensor signal at block 104. The knock sensor signal is also indicative of the engine event in that it may include a response to the engine event exhibited by the knock sensor 23. However, the knock sensor signal may not be used to directly estimate the time of the engine event. Thus, the knock sensor signal may be transformed via a short-time Fourier Transform 106 ("STFT") into a power spectral density 108 ("PSD") over time. The STFT computes PSDs 108 of individual windows (e.g., sub-signals) of the knock sensor signal and plots the computed PSDs 108 over time. Each PSD 108 may include the energy content of the knock sensor sub-signal as a function of frequency (e.g., a plot of frequency energies). The formation of a PSD over time is described in more detail herein with respect to FIG. 5.

After the PSD 108 over time is acquired, the system 25 may mine for predictive frequency bands ("PFBs") 112 at block 110. PFBs 112 are frequency ranges of the knock sensor signal that are indicative of the occurrence of the desired engine event. To mine PFBs 112, the knock signal is broken into a number of sub-signals. A given sub-signal may include the engine event or the sub-signal may pertain to a time before or after the engine event. The number of sub-signals that include the engine event may be represented as "N." In certain embodiments, a discrete frequency value of the knock sensor signal may occur more than once throughout the course of the entire knock sensor signal, such that the discrete frequency value is present in more than one sub-signal of the entire knock sensor signal. For example, a discrete frequency value may be present in a first sub-signal that includes the engine event and in a second sub-signal corresponding to a time before or after engine event occurs. However, even though the discrete frequency value may occur multiple times throughout the entire knock sensor signal, different energy values may be associated with each occurrence of the discrete frequency value. Therefore, the PSD 108 over time may include multiple occurrences of the same discrete frequency; however, each occurrence may not have the same energy content. In certain embodiments, each occurrence of the discrete frequency may be arranged in order of increasing energy. Additionally, each occurrence may be classified as either a positive or a negative. In certain embodiments a positive occurrence corresponds to a sub-signal where the engine event actually occurs. Conversely, a negative occurrence corresponds to a sub-signal where the engine event did not occur. The system 25 may know whether an occurrence of the discrete frequency is positive or negative because the system 25 received the true location of the engine event at block 102.

Once the occurrences of each discrete frequency are arranged in order of increasing energy, a discriminative score ("D-score") may be calculated for each discrete frequency of the knock sensor signal. In certain embodiments, the D-score is computed by selecting the "N" occurrences of the discrete frequency having the greatest energy. Of those selected, the number of positive occurrences may be divided by N to receive the D-score. The D-score calculation is described in more detail herein with reference to FIG. 8.

Once the D-score is computed for a frequency of the knock sensor signal, the system 25 may combine two discrete frequencies and compute a second D-score for the range of frequencies. If the D-score of the range of frequencies is greater than the D-score of the individual, discrete frequency, the system 25 may combine the two discrete frequencies into a frequency range. Furthermore, additional discrete frequency values may be combined to the frequency range, until the D-score cannot be further improved. At this point, the system may use the discrete frequency or frequency range as the PFB 112. The PFB 112 may be indicative of frequency ranges of a knock sensor signal that correspond to the occurrence of the desired engine event.

At block 114, the system 25 may convert each sub-signal into a feature vector utilizing the PFBs 112. Each feature of the feature vector may correspond to a specific PFB (e.g., via an energy). Accordingly, the feature vector may have a length, "i," where the value of the i-th feature corresponds to the energy in the i-th PFB. Thus, the system may compare the feature vectors to the true engine event location and undergo model learning 116, such that the system 25 may associate certain features with the engine event and/or the location of the engine event. For example, the system 25 may use a logistic regression classifier, a support vector machine, or another machine learning algorithm configured to generate a predictive model 118 using the feature vectors and the true location of the engine event. Thus, the system 25 may store the predictive model 118 and utilize the predictive model 118 to determine when a sub-signal includes the engine event and to estimate a location of the engine event.

Figure 4:
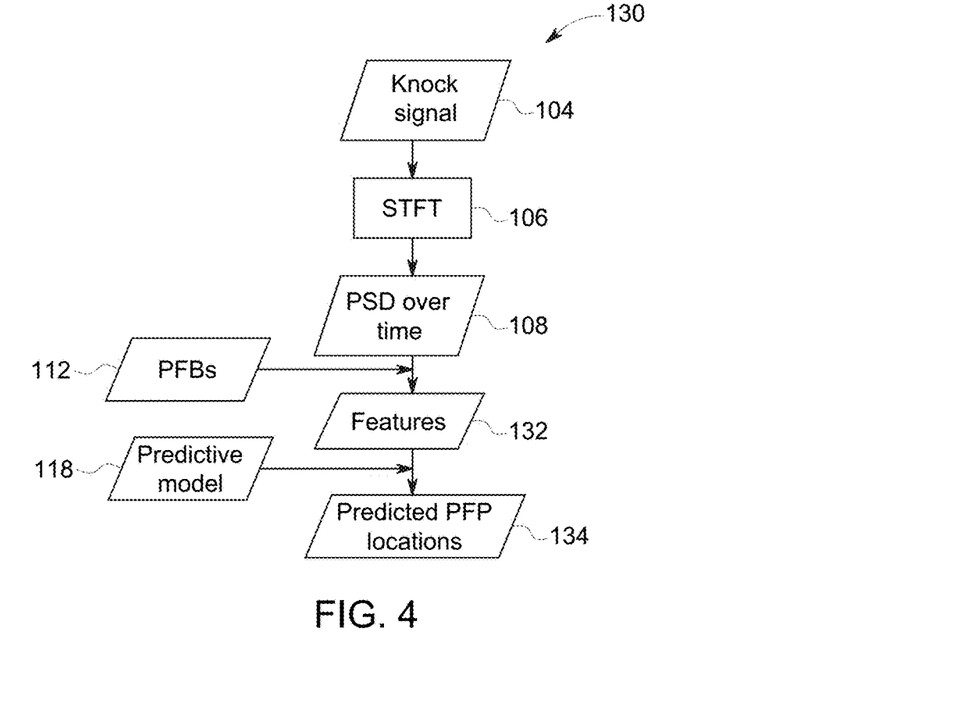
FIG. 4 illustrates a flow chart of a method for utilizing or testing the predictive model and PFBs of FIG. 3 to determine a location of the engine event during ordinary engine operation, in accordance with aspects of the present disclosure.

FIG. 4 illustrates a flow chart 130 of a method for utilizing or testing the predictive model 118 to determine a location of the engine event. Similar to block diagram 100, the system 25 (e.g., a control system, a monitoring system, a controller, or an engine control unit "ECU") may receive a knock sensor signal at block 104 and transform the signal into a PSD 108 over time using an STFT 106. Additionally, the system 25 may transform the PSD 108 over time into feature vectors 132 using the PFBs 112 determined in flow chart 100. The system 25 may utilize the resulting feature vectors 132 and the predictive model 118 to determine a location of the engine event 134. For example, the feature vectors 132 may include information that the system 25 may associate with the location of the engine event. If the engine event was likely to occur during a given sub-signal, the predictive model 118 may compute a probability that the engine event occurred at each time in the sub-window. The system 25 may use the time with the highest probability 134 to control engine operating parameters and enhance engine performance. For example, the system 25 may adjust an engine timing map (e.g., ignition timing) of the engine 10, an oxidant/fuel ratio, a flow of exhaust recirculation gas, a position of the intake 62 or the exhaust valve 64, or another operating parameter of the engine 10.

In certain embodiments, the system 25 will undergo the process in flow chart 130 (e.g., testing mode of the predictive model) immediately after the process in flow chart 100 (e.g., formation of the predictive model). Depending on the difference between the predicted location (e.g., timing) of the engine event (e.g., from flow chart 130) and the true location of the engine event, the system 25 may repeat the process in flow chart 100 until the difference between the estimated location and the true location is at a desirable level (e.g., less than 1° of the crankshaft). In other words, the system 25 may continue to run the process in flow chart 100 to refine the predictive model and PFBs until the timing of the engine event can be estimated within a desired degree of accuracy.

Additionally, the predictive model 118 generated by the process of flow chart 100 may be specific to a particular engine type. For example, the predictive model 118 used to estimate the location of the engine event in a Jenbacher Type 2 Engine may not accurately estimate the location of the engine event in a Jenbacher Type 3 Engine. Thus, the process of flow chart 100 may be performed for each engine type in which the engine event location will be estimated. As non-limiting examples, the process of flow chart 100 may be performed on General Electric Company's Jenbacher Engines (e.g., Jenbacher Type 2, Type 3, Type 4, Type 6 or J920 FleXtra), Waukesha Engines (e.g., Waukesha VGF, VHP, APG, 275GL), or any other reciprocating internal combustion engines.

Figure 5:
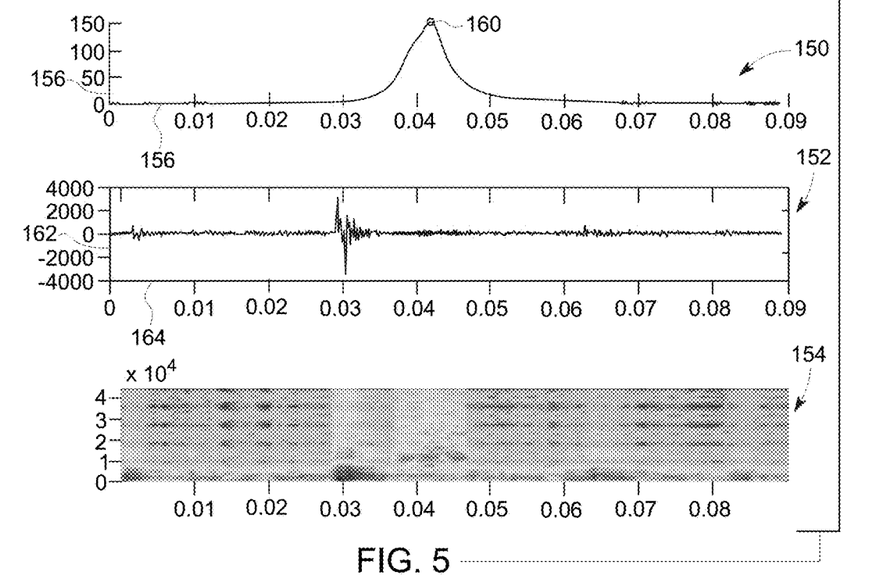
FIG. 5 illustrates a pressure signal plot indicative of a true location of the engine event, a knock sensor signal, and a spectrogram based on the knock sensor signal, in accordance with aspects of the present disclosure.

FIG. 5 illustrates an embodiment of a pressure signal plot 150 indicative of the true time of the engine event, a knock sensor signal 152, and a spectrogram (e.g., PSD over time) 154 based on the knock sensor signal 152. The pressure signal plot 150 may originate from an in-cylinder pressure sensor and provide a true time of the engine event to be detected to the system 25. As shown in the illustrated embodiment, the Y-axis 156 of the pressure signal plot 150 represents a pressure in the cylinder 26 of the engine 10. Additionally, the X-axis 158 represents time (e.g., cranks angle). Thus, the pressure signal plot 150 illustrates pressure in the cylinder 26 over a given time frame. The pressure increases until it reaches a maximum point 160, which represents the true time of the engine event (e.g., PFP). It should be noted that in other embodiments, the timing of an engine event (e.g., closure of the exhaust 62 valve) other than PFP may be estimated. Therefore, the true time of such an engine event may be determined using a plot, other than the pressure plot 150, corresponding to a relevant measurement (e.g., angle of exhaust valve, flow rate of exhaust gases from exhaust valve, etc.) of the engine event over time.

As illustrated, the knock sensor signal 152 has a Y-axis 162 that represents a voltage, resistance, or other quantity representative of the response exhibited by the knock sensor 23 to a change in vibration, sound, acoustics, etc in the cylinder 26. The knock sensor signal also has an X-axis 164 that represents time (e.g., crank angle), which is substantially aligned with the X-axis 158 of the pressure signal plot 150. As shown, the knock sensor 23 exhibits the greatest response before the true time of the PFP (e.g., the knock sensor signal 152 exhibits the greatest change in magnitude at a timing of approximately 0.03, whereas the PFP occurs after 0.04). Therefore, it may not be accurate to estimate the timing of the desired engine event by simply computing the time at which the knock sensor signal 152 exhibits the greatest rate of change. Accordingly, other computations and/or manipulations may be applied to the knock sensor signal 152 to estimate the time of the desired engine event.

The spectrogram 154 illustrates one computation that may be performed on the knock sensor signal 152. For example, the spectrogram 154 may represent a power spectral density of the knock sensor signal 152 over time. The power spectral density may refer to the energy content of the knock sensor signal 152 as a function of frequency. In other words, the power spectral density is a function of frequency and not time. Therefore, the spectrogram 154 may illustrate individual power spectral densities of sub-signals (e.g., windows) of the knock sensor signal 152 as a function of the timing (e.g., crank angle). In other embodiments, the spectrogram 154 may categorize different frequencies of the knock sensor signal 152 in accordance with an intensity of the frequency (e.g., different shades on the spectrogram 154 refer to different intensities of a given frequency). To transform the knock sensor signal 152 to the spectrogram 154, a multivariate transformation algorithm may be applied to the knock sensor signal 152. In certain embodiments, the spectrogram 154 is produced using the short-time Fourier transform ("STFT") 106. In other embodiments, the spectrogram 154 may be generated using another type of Fourier Transform, a discrete cosine transform, a Laplace Transform, a Mellin Transform, a Hartley Transform, a Chirplet Transform, a Hankel Transform, or any combination thereof. The spectrogram 154 may be utilized in order to create the predictive model 118 that estimate a location of the engine event (e.g., PFP) as described above.

It should be noted that, in certain embodiments, the system 25 may not physically generate the spectrogram 154. The system 25 may encapsulate, or conceal, the functionality provided by the spectrogram in the processing steps performed by the processor 72 and/or stored in the memory unit 74, such that the spectrogram is never displayed or even obtainable by a user. For example, the system 25 may directly convert the signal from the knock sensor 23 into the feature vectors or may incorporate the functionality provided by the spectrogram into one or more transform functions or comparable mathematical constructs so as to streamline certain of the steps discussed herein. Additionally, the spectrogram 154 should not be limited to the embodiment illustrated in FIG. 5. In other embodiments, the spectrogram 154 (or its data construct equivalent) may be any data, data table, algorithm, graph, chart, or the like that is intended to represent frequencies, and the intensity of those frequencies, in the knock sensor signal 152 over time. For example, the spectrogram 154 may categorize intensities of frequencies in a manner other than color (e.g., shapes, letters, numbers, shading, etc.).

Figure 6:
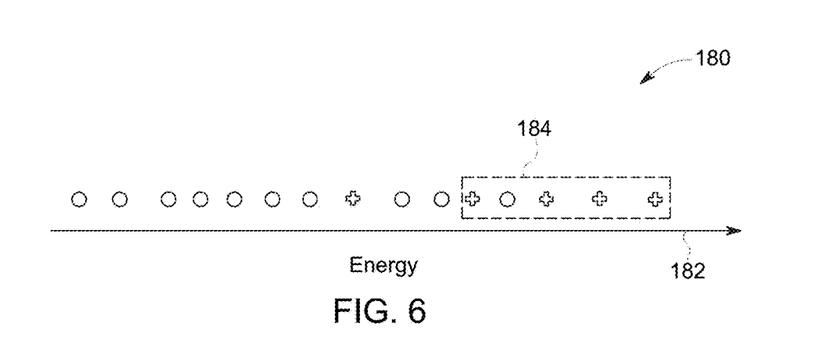
FIG. 6 is a chart illustrating how the system may determine a D-score of a particular frequency, in accordance with aspects of the present disclosure.

FIG. 6 is a chart illustrating how the system 25 (e.g., a control system, a monitoring system, a controller, or an engine control unit "ECU") may determine a D-score of a discrete frequency or a frequency range. As illustrated, occurrences of the particular, discrete frequency are arranged in order of increasing energy as well as characterized as positive (e.g., in a sub-signal where the engine event occurred) or negative (e.g., in a sub-signal where the engine event did not occur). The chart 180 includes multiple occurrences that correspond to the same discrete frequency, but possess differing energy values because each occurrence may belong to a different sub-signal of the knock sensor signal 152. As illustrated, the chart 180 includes an axis 182 representing the energy associated with each occurrence of the discrete frequency. Energy increases from left to right such that the occurrences with the lowest energy are on the left and the occurrences with the highest energy are on the right. As described above, the D-score may be computed by selecting the "N" occurrences with the largest energy values, where "N" represents the number of sub-signals that include the engine event. In the illustrated embodiment, "N" is equal to five because there are five total occurrences that are classified as positive (i.e., are within a sub-signal where the engine event occurred). However, of the five occurrences selected 184, only four are positive. Thus, the D-score of the illustrated embodiment is 4 divided by 5, or 0.8. It should be noted that while "N" is equal to five in chart 180, "N" can be any positive integer, such as 1, 2, 3, 4, 5, 6, 7 8, 9, 10, 12, 14, 16, 18, 20, 30, 40, 50, or more. As discussed previously, the D-score may be calculated for a range of discrete frequencies, in addition to the discrete frequencies themselves, to determine the PFBs 112.

Figure 7:
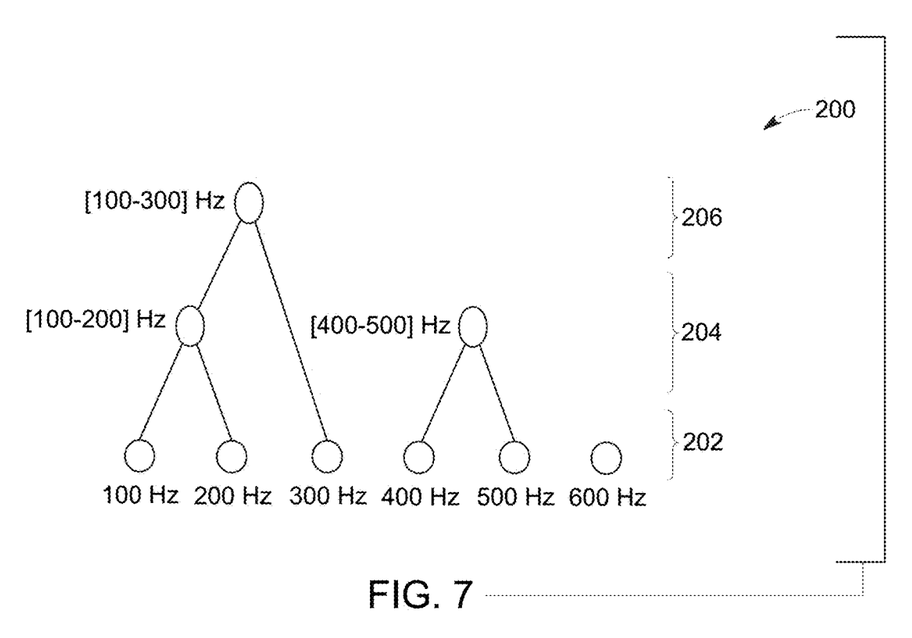
FIG. 7 is a diagram illustrating how the system constructs PFBs based on a D-score value, in accordance with aspects of the present disclosure.

FIG. 7 is a diagram illustrating how the system (e.g., a control system, a monitoring system, a controller, or an engine control unit "ECU") constructs PFBs 112 based on a D-score value. In certain embodiments, the diagram 200 includes three tiers (e.g., levels); however, other embodiments may have less than three levels (e.g., 1 or 2), while other embodiments may have more than three levels (e.g., 4, 5, 6 or more). In the diagram 200, the first tier 202 includes all of the discrete frequencies in the spectrum (e.g., all of the frequencies in the knock sensor signal 152). The second tier 204 is a combination of two discrete frequencies from the first tier 202. For example, a 100 Hertz ("Hz") and a 200 Hz discrete frequency are merged into a 100-200 Hz frequency range. As discussed previously, the discrete frequencies of a tier may be merged when the D-score of the frequency range is greater than the D-score of the individual, discrete frequency. Accordingly, in certain embodiments, the D-score of the 100-200 Hz frequency range is greater than the individual D-scores of the 100 Hz and 200 Hz discrete frequencies.

Similarly, a 400 Hz and a 500 Hz discrete frequency may be merged into a 400-500 Hz frequency range, as illustrated in the diagram 200. Again, this may occur because the D-score of the 400-500 Hz frequency range is greater than the individual D-scores of the 400 Hz and 500 Hz discrete frequencies. If no combination of discrete frequencies occurs, then the D-score of the individual, discrete frequency may have been larger than the D-score of the combined frequency range. For example, a 600 Hz discrete frequency was not combined with any other discrete frequency or frequency range. Therefore, the 600 Hz D-score may have been larger than the D-score of the 500-600 Hz frequency range or the 400-600 Hz frequency range.

The diagram 200 also has a third tier 206. The third tier represents a frequency range that is larger (e.g., broader) than the frequency range of the second tier (e.g., the third tier has a frequency range of 200 Hz whereas the second tier has a frequency range of 100 Hz). As shown in the diagram 200, a 300 Hz discrete frequency was combined with the second tier frequency range of 100-200 Hz to create a third tier frequency range of 100-300 Hz. Therefore, the D-score of the frequency range of 100-300 Hz may be greater than that of the D-score of the frequency range of 100-200 Hz as well as the D-score for each of the individual, discrete frequencies (e.g., the D-score for 100 Hz, 200 Hz, and 300 Hz).

Once the D-score can no longer be increased by combining another individual, discrete frequency, a PFB 112 has been determined. For example, if the D-score of a 100-400 Hz frequency range is less than the D-score for the 100-300 Hz frequency range, then the 400 Hz discrete frequency is not combined into the PFB 112, and the 100-300 Hz is the frequency range for the PFB 112.

Figure 8:
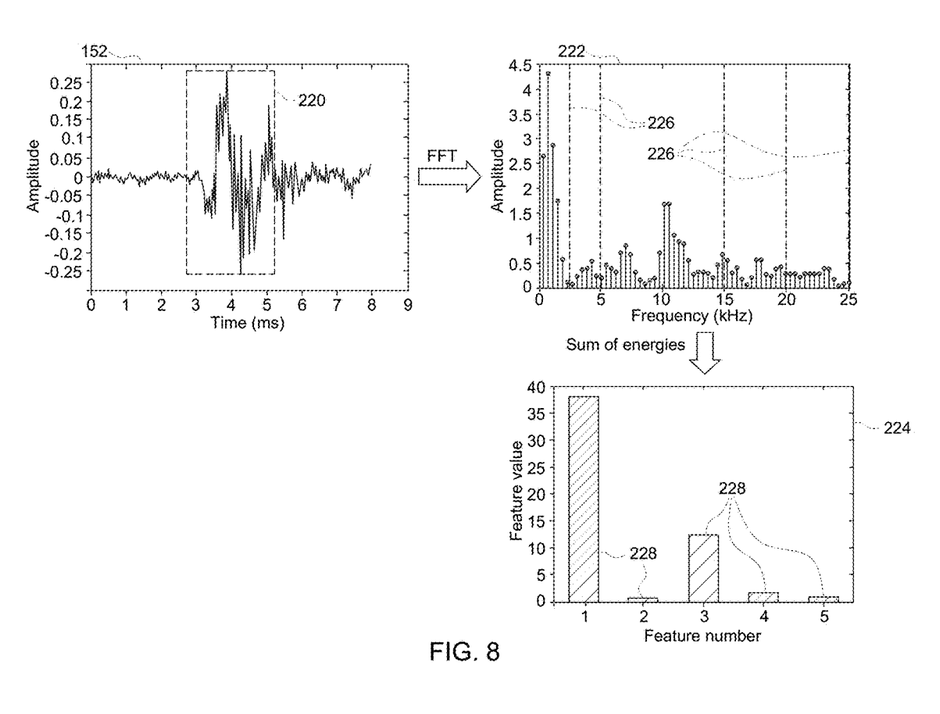
FIG. 8 illustrates three graphs that may be used to predict a time of the desired engine event, in accordance with aspects of the present disclosure.

FIG. 8 further illustrates how the knock sensor signal 152 may be transformed to estimate a location of the desired engine event (e.g., PFP) during ordinary engine operation. In other words, FIG. 8 illustrates and elaborates on the process in flow chart 130. FIG. 8 illustrates a sub-signal 220 of the knock sensor signal 152, a power spectral density plot 222 ("PSD plot"), and a chart of a feature vector 224.

In certain embodiments, the system 25 is trained to identify locations of the desired engine event (e.g., PFP) using the PFBs 112 and the predictive model 118. Therefore, when the engine operates under ordinary conditions (e.g., not operating to collect a signal of the desired engine event) the system 25 receives a signal from the knock sensor 23, but does not receive the pressure signal 150 or other signal indicative of the engine event (e.g., PFP). Accordingly, the system 25 does not know the true timing of the desired engine event. In certain embodiments, the system 25 extracts a sub-signal 220 from the knock sensor signal 150. Additionally, the system 25 may produce the PSD plot 222 by applying the STFT 106 to the sub-signal 220. In other embodiments, the PSD plot 222 may be generated using another type of Fourier Transform, a discrete cosine transform, a Laplace Transform, a Mellin Transform, a Hartley Transform, a Chirplet Transform, a Hankel Transform, or any other transform configured to generate a plot of PSDs over time.

The PSD plot 222 may be separated into the PFBs (e.g., lines 226) determined in the flow chart 100. As described above, the PSD plot 222 includes the energies of the sub-signal 220 as a function of frequency.

The feature vector 224 may be created from the PSD plot 222 and the PFB lines 226. In certain embodiments, the number of features 228 may correspond to the number of PFBs. For example, the PSD plot 222 is separated into five portions by lines 226 (e.g., five PFBs). Thus, five features 228 are included in the feature vector 224. As shown in the illustrated embodiment, the five features v 228 do not have equal feature values. However, in other embodiments, the features 228 may have the same feature values. As described above, the i-th feature corresponds to the energy of the sub-signal in the i-th PFB. It should be understood that while the illustrated feature vector 224 includes five features 228 more or less features may be formed and included in the feature vector 224. For example, the feature vector 224 may have 1, 2, 3, 4, 6, 7, 8, 9, 10, 12, 15, 20, 25, 30, 40, 50, or more features.

In certain embodiments, the predictive model 118 may be applied to the feature vector to compute a probability that the desired engine event occurred at each location. The location that possesses the largest probability may be utilized by the system 25 to adjust various operating parameters (e.g., an engine timing map of the engine 10, an oxidant/fuel ratio, a flow of exhaust recirculation gas, a position of the intake 62 or exhaust valve 64, or another operating parameter of the engine 10) of the engine 10 to enhance engine performance.

Figure 9:
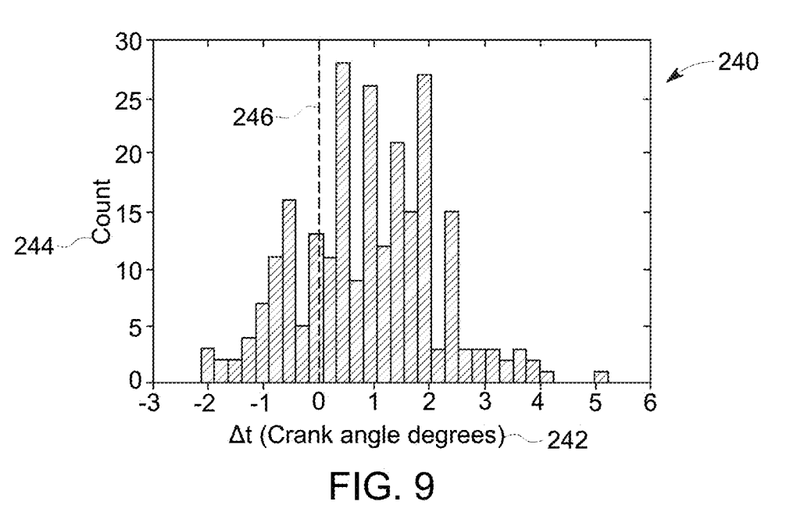
FIG. 9 is a histogram including error values for a plurality of tests performed using the predictive model and PFBs of FIG. 3, in accordance with aspects of the present disclosure.
Figure 10:
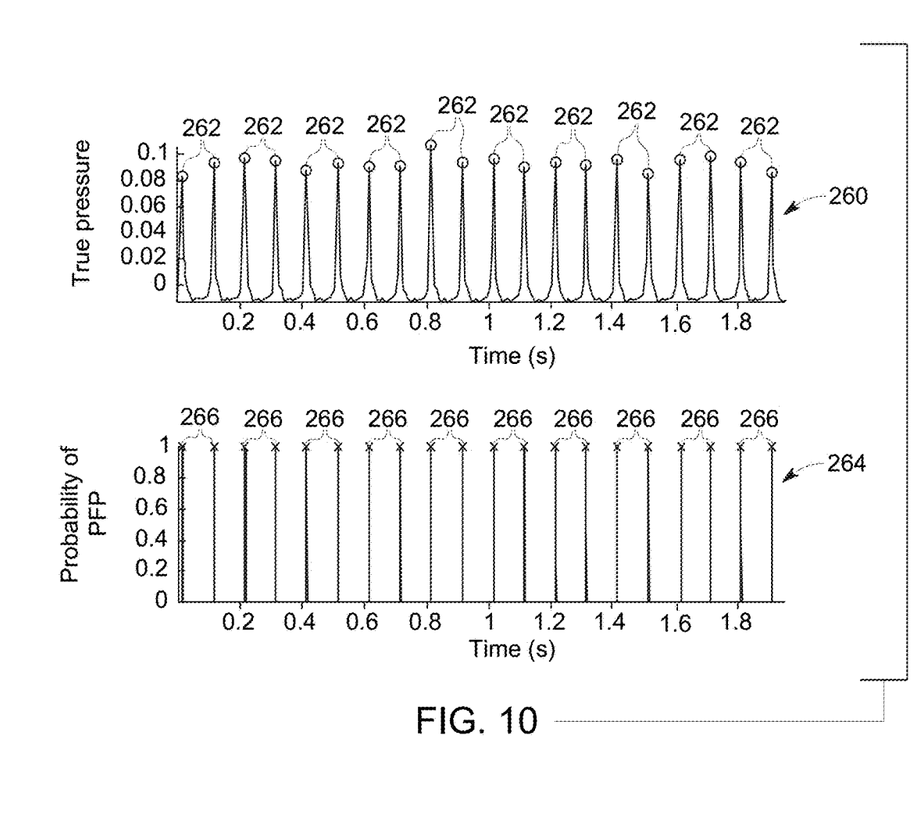
FIG. 10 illustrates a first graph representative of a true pressure within an engine cylinder over time, and a second graph displaying a probability that a peak firing pressure event occurs over time to estimate a location of the peak firing pressure in the engine, in accordance with aspects of the present disclosure.
Figure 11:
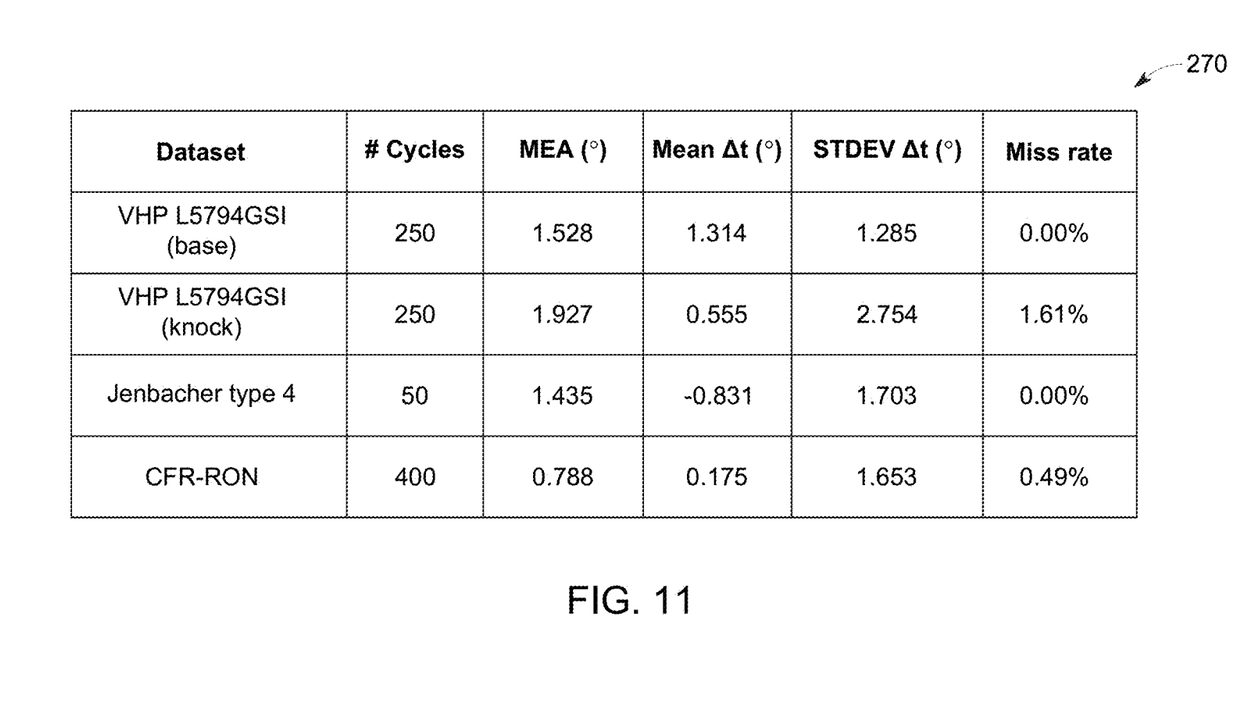
FIG. 11 illustrates a table that includes values comparing an estimated time (e.g., crank angle degree) of the engine event using the predictive model and PFBs of FIG. 3 and a true time (e.g., crank angle degree) of the engine event, in accordance with aspects of the present disclosure.

FIGS. 9-11 illustrate charts and tables comparing the estimated time by the predictive model 118 to the true time of the engine event determined by the pressure signal plot 102 or another signal measuring a relevant engine operating parameter (intake valve 62 or exhaust valve 64 angle) indicative of the desired engine event over time. FIGS. 9 and 10 were generated by testing the presently disclosed techniques on a VHP L5794GSI (base) engine. FIG. 11 was generated by testing the presently disclosed techniques on a VHP L5794GSI (base) engine, a VHP L5794GSI (knock) engine, a Jenbacher Type 4 engine, and a CFR-RON engine.

For example, FIG. 9 is a histogram 240 plotting the error for a plurality of tests performed using the predictive model. FIG. 9 is meant to be representative of what can be achieved by the disclosed embodiments, and therefore, it is not meant to limit the presently disclosed embodiments to only such results. Specifically, the histogram 240 plots a number of times the predictive model 118 estimated the timing of the desired engine event within a certain value of the true time of the engine event. The X-axis 242 of the histogram 240 represents the difference between the estimated time (e.g., crank angle degree) using the predictive model 118 and the true time (e.g., crank angle degree) of the engine event. The Y-axis 244 represents the number of trials that achieved that difference value. A line 246 represents the most accurate estimates of the location of the engine event by the predictive model 118 because the line 246 corresponds to a difference of zero between the estimated location and the true location. As can be seen by the histogram 240, the predictive model almost always estimates the time of the engine event within 5° of the crankshaft, and thus is relatively accurate.

FIG. 10 illustrates a first graph 260 representative of the true pressure within the cylinder 26 over time, and thus the true locations 262 of the engine event. Additionally, a second graph 264 represents a probability, or estimate, that the desired engine event will occur at a time 266 using the predictive model 118. Again, FIG. 10 is meant to be representative of what can be achieved by the disclosed embodiments, and therefore, it is not meant to limit the presently disclosed embodiments to only such results. However, as can be seen in FIG. 10, the predictive model 118 is relatively accurate in estimating the timing of the engine event because the peaks 266 of the second graph 264 (e.g., the estimated probability of the peak firing pressure event) match very closely to the true locations 262 illustrated in the first graph 260.

FIG. 11 illustrates a table 270 that includes values comparing an estimated location (e.g., timing) of the engine event using the predictive model 118 and the true location of the engine event. FIG. 11 is also meant to be representative of what can be achieved by the disclosed embodiments, and therefore, it is not meant to limit the presently disclosed embodiments to only such results. FIG. 11 includes data for number of cycles 272 performed, mean absolute error 274 of the tests performed, mean of detection error 276, standard deviation of detection error 278, and a miss rate 280. FIG. 11 shows that the predictive model 118 can potentially predict the location (e.g., timing) of the engine event within 2° of the crankshaft (e.g., the mean of detection error 276 column) In certain embodiments, the predictive model 118 may estimate a location (e.g., timing) of the engine event within 0 and 30 crank angle degrees; 0 and 25 crank angle degrees; 0.05 and 15 crank angle degrees; or anywhere therebetween. Additionally, FIG. 11 illustrates the miss rate 280 of the predictive model 118, where the miss rate 280 may be defined as the percentage of total engine cycles that the estimated location (e.g., timing) of the engine event was more than 10° of the crank away from the true engine event location. In other embodiments, the miss rate 280 may be defined as the percentage of total engine cycles that the estimated location (e.g., timing) of the engine event was more than 15° of the crankshaft 54 away from the true engine location. In still further embodiments, the miss rate 280 may be defined as the percentage of total engine cycles that the estimated location (e.g., timing) of the engine event was more than 1, 2, 3, 4, 5, 6, 7, 8, 9, 11, 12, 13, 14, 20, 25, 30, 35, 40, 45, 50, or more crank angles away from the true engine location. As illustrated by the data in FIG. 11, the predictive model 118 can be employed within the engine 10 during ordinary operation and accurately estimate the location of the desired engine event (e.g., from the miss rate 280 column).

Technical effects of the invention include receiving a signal from a knock sensor related to an engine event. The signal may be used to estimate a location of the engine event using a predictive model and PFBs. Parameters of the engine may be adjusted based on the estimated location to improve fuel efficiency, enhance power output, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for estimating an engine event location, comprising:
   a controller configured to:
      receive a signal from at least one knock sensor coupled to a reciprocating engine, transform the signal, using a multivariate transformation algorithm, into a power spectral density, transform the power spectral density into a plurality of feature vectors using predictive frequency bands, predict the engine event location using at least the plurality of feature vectors and a predictive model, and adjust operation of the reciprocating engine based on the engine event location.

2. The system of claim 1, wherein the engine event comprises a peak firing pressure of a cylinder of the reciprocating engine.

3. The system of claim 2, wherein the controller is configured to adjust an engine timing map of the reciprocating engine, an oxidant/fuel ratio of the reciprocating engine, a flow of exhaust recirculation gas of the reciprocating engine, a position of an intake or exhaust valve of the reciprocating engine, or another operating parameter of the reciprocating engine in response to the location of the peak firing pressure.

4. The system of claim 1, wherein the engine event comprises a closure of an intake and/or an exhaust valve of the reciprocating engine.

5. The system of claim 1, wherein the multivariate transformation algorithm comprises a short-time Fourier Transform.

6. The system of claim 1, wherein the multivariate transformation algorithm comprises a discrete cosine transform.

7. The system of claim 1, wherein the at least one knock sensor comprises a piezoelectric knock sensor configured to sense vibrations and/or acoustics in a cylinder of the reciprocating engine.

8. The system of claim 1, wherein the predictive model is trained to predict the engine event location for a particular reciprocating engine.

9. The system of claim 8, wherein the particular reciprocating engine comprises a Waukesha VHP engine, a Jenbacher Type 4 engine, or any other internal reciprocating engine.

10. A method for training a controller to estimate the location of peak firing pressure in a reciprocating engine, comprising:
    receiving a first signal from at least one knock sensor, wherein the signal comprises data corresponding to a peak firing pressure event;
    receiving a second signal from a pressure sensor corresponding to the true peak firing pressure location;
    transforming the first signal into a power spectral density comprising frequency energies over time;
    comparing the power spectral density to the second signal to form predictive frequency bands;
    converting the power spectral density into a plurality of feature vectors; and
    executing an algorithm to generate a predictive model using the plurality of feature vectors and the second signal, wherein the predictive model is configured to estimate the location of peak firing pressure in the reciprocating engine during ordinary engine operation.

11. The method of claim 10, wherein the predictive frequency bands are formed by calculating a discriminative score.

12. The method of claim 11, wherein the calculation of the discriminative score, comprises:
    extracting a first subset of the frequency energies over time, wherein the first subset corresponds to the frequency energies for a first frequency range;
    sorting the first subset in order of increasing energy;
    characterizing each frequency energy of the first subset as positives and negatives, wherein the positives correspond to the frequency energies that occurred within a sub-signal of the first signal that includes the peak firing pressure;
    selecting a segment of the frequency energies of the first subset comprising the highest energy, wherein the segment comprises a number of frequency energies equal to a number of the positives in the first subset;
    determining the number of frequency energies in the segment that are true positives to calculate the discriminative score; and
    repeating the calculation of the discriminative score for a second subset of the frequency energies over time until the discriminative score fails to increase, wherein the second set corresponds to the frequency energies for a second frequency range, and wherein the second frequency range is larger than the first frequency range.

13. The method of claim 10, wherein the pressure sensor is an in-cylinder pressure sensor.

14. The method of claim 10, wherein the machine learning algorithm comprises a logistic regression classifier, a support vector machine, or another machine learning algorithm configured to generate a predictive model using feature vectors and a pressure signal.

15. The method of claim 10, wherein the method is repeated until the predictive model estimates the peak firing pressure within 10 degrees of the actual peak firing pressure.

16. The method of claim 10, wherein the reciprocating engine is a Waukesha VHP engine, a Jenbacher Type 4 engine, a CFR-RON engine, or any other internal reciprocating engine.

17. A system, comprising:
    a reciprocating engine controller configured to:
        receive a signal from at least one knock sensor coupled to the reciprocating engine;
        transform the signal into a power spectral density comprising a plurality of frequency energies over time using a multivariate transformation algorithm;
        transform the power spectral density into a plurality of feature vectors using predictive frequency bands;
        predict a peak firing pressure location using at least the plurality of feature vectors and a predictive model;
        output a control action for at least the reciprocating engine based on the location of the peak firing pressure.

18. The system of claim 17, wherein the control action comprises adjusting an engine timing map of the reciprocating engine, an oxidant/fuel ratio of the reciprocating engine, a flow of exhaust recirculation gas of the reciprocating engine, a position of an intake or exhaust valve of the reciprocating engine, or another operating parameter of the reciprocating engine in response to the location of the peak firing pressure.

19. The system of claim 17, wherein the multivariate transformation algorithm comprises a short-time Fourier Transform.

20. The system of claim 17, wherein the predictive model is trained to predict the engine event location for a particular reciprocating engine.

* * * * *